(12) United States Patent
Westermann et al.

(10) Patent No.: US 7,628,560 B2
(45) Date of Patent: Dec. 8, 2009

(54) SUPPORT FOR THE JOINT HINGE OF WIPER BLADE

(75) Inventors: Klaus-Juergen Westermann, Karlsbad (DE); Eric Pollaris, Meeuwen-Gruitrook (DE); Andreas Strauss, Herxheim (DE)

(73) Assignee: Robert Bosch GmbH, Stuttgart (DE)

( * ) Notice: Subject to any disclaimer, the term of this patent is extended or adjusted under 35 U.S.C. 154(b) by 1328 days.

(21) Appl. No.: 09/319,842

(22) PCT Filed: Oct. 8, 1998

(86) PCT No.: PCT/DE98/02971

§ 371 (c)(1),
(2), (4) Date: Aug. 9, 1999

(87) PCT Pub. No.: WO99/20504

PCT Pub. Date: Apr. 29, 1999

(65) Prior Publication Data

US 2002/0141814 A1 Oct. 3, 2002

(30) Foreign Application Priority Data

Oct. 16, 1997 (DE) ................................ 197 45 845

(51) Int. Cl.
*B60S 1/40* (2006.01)

(52) U.S. Cl. ............... 403/4; 15/250.43; 15/250.44; 15/250.32; 403/213

(58) Field of Classification Search ............ 403/4, 403/213; 15/250.43, 250.44, 250.32
See application file for complete search history.

(56) References Cited

U.S. PATENT DOCUMENTS

| 5,289,608 A | * | 3/1994 | Kim | ........................ | 15/250.32 |
| 5,611,103 A | * | 3/1997 | Lee | ........................ | 15/250.32 |

FOREIGN PATENT DOCUMENTS

| EP | 655373 | * | 11/1994 | ............. | 15/250.32 |
| FR | 2482914 | * | 11/1981 | ............. | 15/250.32 |
| FR | 2631300 | * | 11/1989 | ............. | 15/250.32 |
| GB | 2156666 | * | 3/1985 | ............. | 15/250.32 |
| SE | 226017 | * | 4/1969 | ............. | 15/250.32 |

OTHER PUBLICATIONS

Derwet, 1995-195494, Translation of EP-655,373 A1 patent abstract.*
Derwet, 1990-010428, Translation of FR-2,631,300 A1 patent abstract.*

* cited by examiner

*Primary Examiner*—Daniel P Stodola
*Assistant Examiner*—Ernesto Garcia
(74) *Attorney, Agent, or Firm*—Michael J. Striker

(57) ABSTRACT

A support (30) for the joint hinge of a wiper blade (10) at a hook-shaped end (20) of a bar (18) in a windshield wiper. Owing to an open hub on part of its periphery (28), the support can be slipped on a bearing shank of the wiper blade (10) and, so mounted, be maintained by the hook-shaped end (20) above hub surfaces (46, 62, 66) and ratchet elements (70, 76, 78). The two side walls (32, 34) which are connected by the hub (36) and a plurality of crossbars (60, 64, 70) extend in the longitudinal direction (38), on both sides, towards the hub (34) and the inside widths (40, 42) between the side walls (32, 34) are different at their opposite ends.

8 Claims, 5 Drawing Sheets

SUPPORT FOR THE JOINT HINGE OF WIPER BLADE

BACKGROUND OF THE INVENTION

The invention is based on a bearing element for hinging a wiper blade.

Known windshield wipers have a wiper arm that is comprised of a fastening part and an articulating part hinged to it that has a wiper rod. Furthermore, the have wiper blade that is comprised of a support bracket system with a primary center bracket and articulatingly connected, subordinate intermediary brackets as well as claw brackets and a wiper strip. The wiper blade is linked to the wiper arm by virtue of the fact that a hook-shaped end of the wiper rod holds a bearing element that is disposed between two side-pieces of the center bracket and, with a hub that is open over a circumference region, constitutes a hinge bolt of the center bracket. The articulation thus formed guides the wiper blade during the pivoting motion over the windshield, wherein the articulation and the support bracket system make it possible for the wiper strip to be able to adapt to a convexity of the windshield.

While the wiper arm is as a rule embodied in a vehicle specific manner and experiences practically no wear during the service life, the wiper blade wears particularly at the articulations and on the wiper strip so that it must be replaced frequently during the service life of the vehicle. In this connection, as a rule not only is the wiper strip replaced but also the entire wiper blade, which is commercially available.

In order to keep the number of wiper blade types low, plastic bearing elements are packaged along with the wiper blades and have a number of receiving devices for the wiper rod thus permitting the same wiper to be used with wiper rods of different material thicknesses and widths as well as different material thicknesses and widths as well as different bending radii and detent elements. From the available bearing elements, the user selects the one suited for his vehicle and discards the rest. The excess bearing elements increase the wiper blade packaging and lead to an increase in waste. Furthermore the transport and storage volume is increased.

EP 0 234 525 B1 has disclosed a bearing element of this generic type, which has a lateral strut that is offset from the open hub in the longitudinal direction and, when the bearing element is mounted on the hook-shaped end of the wiper rode, serves as a fixing in the longitudinal direction. To that end, the lateral strut has a distance from the rotational axis of the hub, which corresponds to the external bending radius of the hook-shaped end of the wiper rode. The wiper rode therefore does not require any detent opening for the longitudinal securing of the bearing element. The bearing element is consequently suited for wiper rods with and without a detent opening.

Furthermore, EP 0 655 373 A1 has disclosed a similar bearing element, which has two lateral struts disposed offset from the hub in the longitudinal direction, which serve as a longitudinal securing device for a hook-shaped end of a wiper rod, and the lateral strut that is disposed closest to the rotational axis is used for a hook-shaped end with a smaller bending radius and the other lateral strut is used for a hook-shaped end with a larger bending radius. The hook-shaped end with a larger-bending radius rests with its curved inner surface against a correspondingly shaped contact face of the first lateral strut. Consequently this bearing element is suited for wiper rods whose hook-shaped ends have two different bending radii. In order to keep the wiper rode from rotating in relation to the wiper rod it has an additional lateral strut and a detent projection disposed offset toward the hub. When mounting, the wiper rod is locked in detent fashion between the lateral strut and the detent projection.

SUMMARY OF THE INVENTION

According to the invention, the bearing element has two side walls that are connected by way of an open hub and a number of lateral struts. The side walls extend in the longitudinal direction of the bearing element on both sides of the hub wherein the clearances of the side walls are different sizes on the opposite ends. The bearing element can consequently be used for wiper rods of a different widths by virtue of the fact that on the one hand, a wide wiper rod is guided laterally between the end regions of the side walls that have a large clearance and on the other hand a narrower wiper rod is guided between the end regions on the opposite end of the bearing element.

Advantageously, the bearing element has the same external width at both ends so that it is favorably guided between the side-pieces of the center bracket. This is achieved by means of beads that define the smaller clearance of the side walls at one end.

According to one embodiment of the invention, an outer contour of the hub has a contact face for the hook-shaped end of the wiper rod with a small bending radius and a smaller material thickness. In the clearance that corresponds to the material thickness, a first lateral strut is disposed offset from the hub in the longitudinal direction and when mounted, rests against the outer bending radius of the hook-shaped end and consequently fixes the bearing element to the wiper arm the longitudinal direction. As a result, an otherwise customary detent projection which engages in a detent opening of the hook-shaped end of the wiper rod, is no longer necessary consequently, the bearing element is suited for wiper rods with different detent openings or those that do not have any detent opening.

For wiper rods with a hook-shaped end that has a larger bending radius, the first lateral strut has a contact face on its outer contour remote from the hub. At a distance from this contact face corresponding to the larger material thickness of the wiper rod, a second lateral strut is disposed, which represents a stop for the wiper rod in the longitudinal direction when mounted.

The second lateral strut has a flattened contact face toward the hub for a narrower wiper rod with a hook-shaped end that has a smaller bending radius and a smaller material thickness. In this instance, the first lateral strut is used to fix the wiper rod in the longitudinal direction when mounted. In this connection, the flattening selected so that is the central, flattened region of the contact face, the distance to the first lateral strut corresponds to the larger material thickness of the wiper rod with a larger bending radius.

In order to limit the pivoting motion of the wiper rod in the relation to the bearing element, additional lateral struts are provided against which there wipe rod rests when mounted suitably, a detent projection is provided on the side walls, at least on one end which connection with the additional lateral struts, secure the wiper rod in the mounted position. The legs of the wiper rod on its hook-shaped end are disposed virtually parallel to the longitudinal direction, wherein the wiper rod is fixed between the additional lateral struts and the respective detent projections. So that wiper rods with a different material thickness can be fixed in a play-free manner, it is advantageous to dispose the detent projection as offset in relation to the other struts, toward the hub in the longitudinal direction. As a result the, wiper rod with the smaller material thickness is given a greater inclination in relation to the longitudinal direction so that it fills the intermediary space projection in the longitudinal direction between additional lateral strut and the detent hub in a play-free manner.

BRIEF DESCRIPTION OF THE DRAWINGS

Additional advantages ensue from the following description of the drawings. An exemplary embodiment of the invention is depicted in the drawings, the drawings, the description, and the claims contain numerous features in combination. One skilled in the art will also suitably consider the features individually and will combine them into meaningful additional combinations.

DESCRIPTION OF THE PREFERRED EMBODIMENTS

Figure 1:
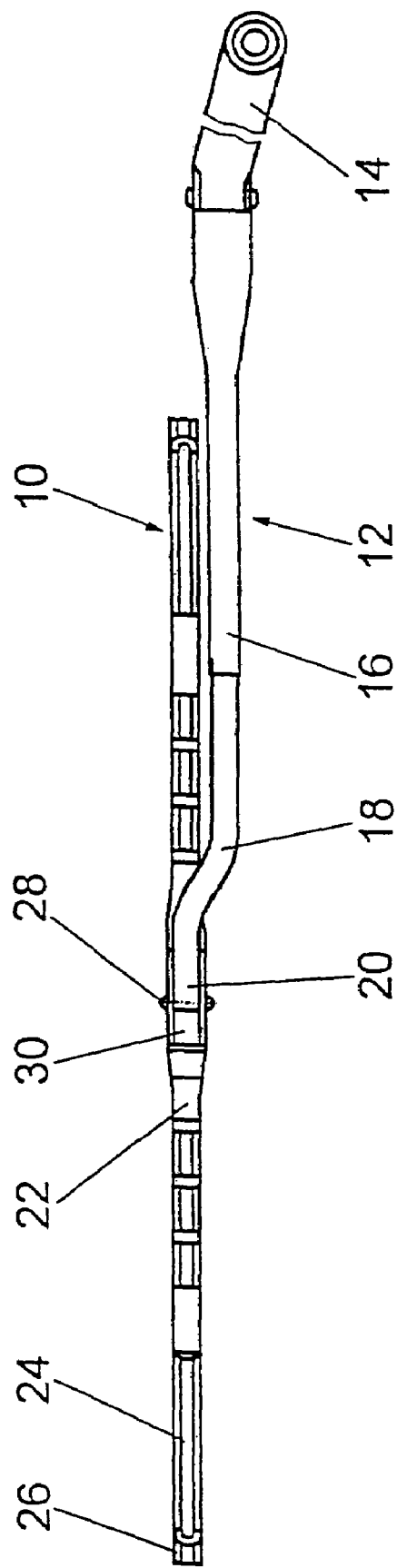
FIG. 1 is a top view of a windshield wiper.
Figure 2:
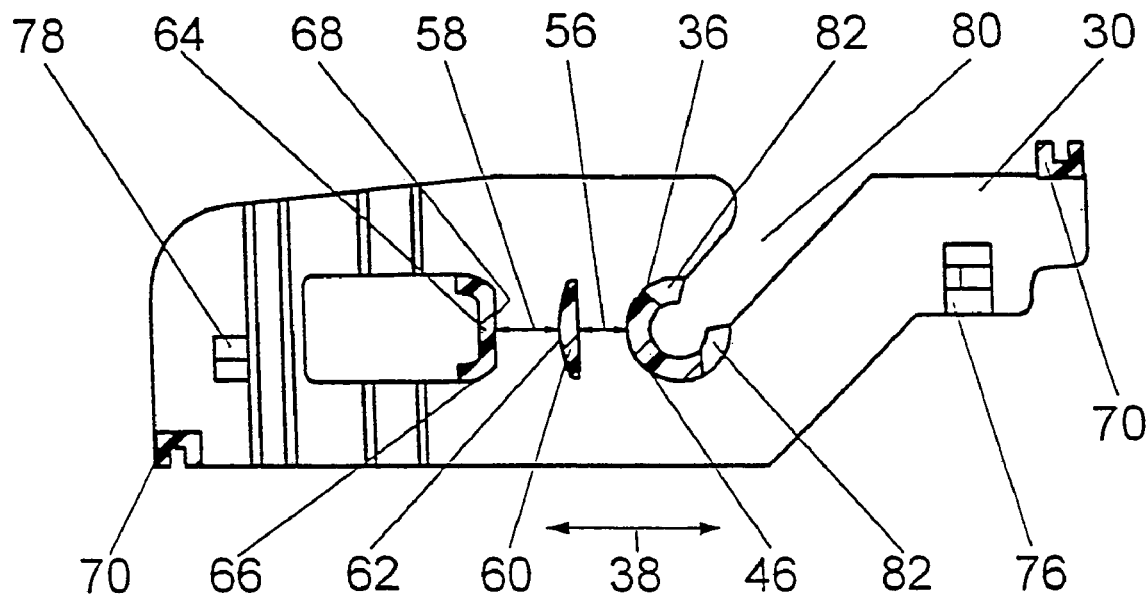
FIG. 2 is a longitudinal section through a bearing element according to the invention.
Figure 3:
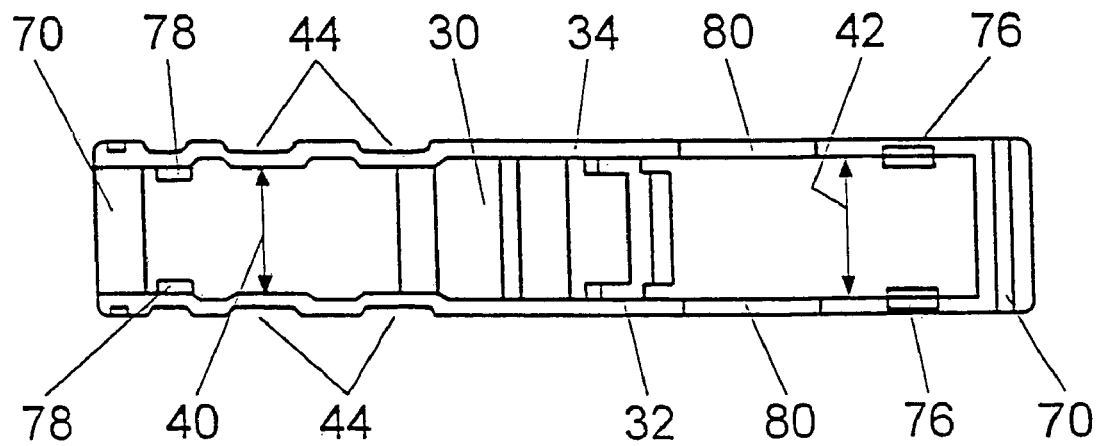
FIG. 3 is a top view of the bearing element according to FIG. 2.
Figure 4:
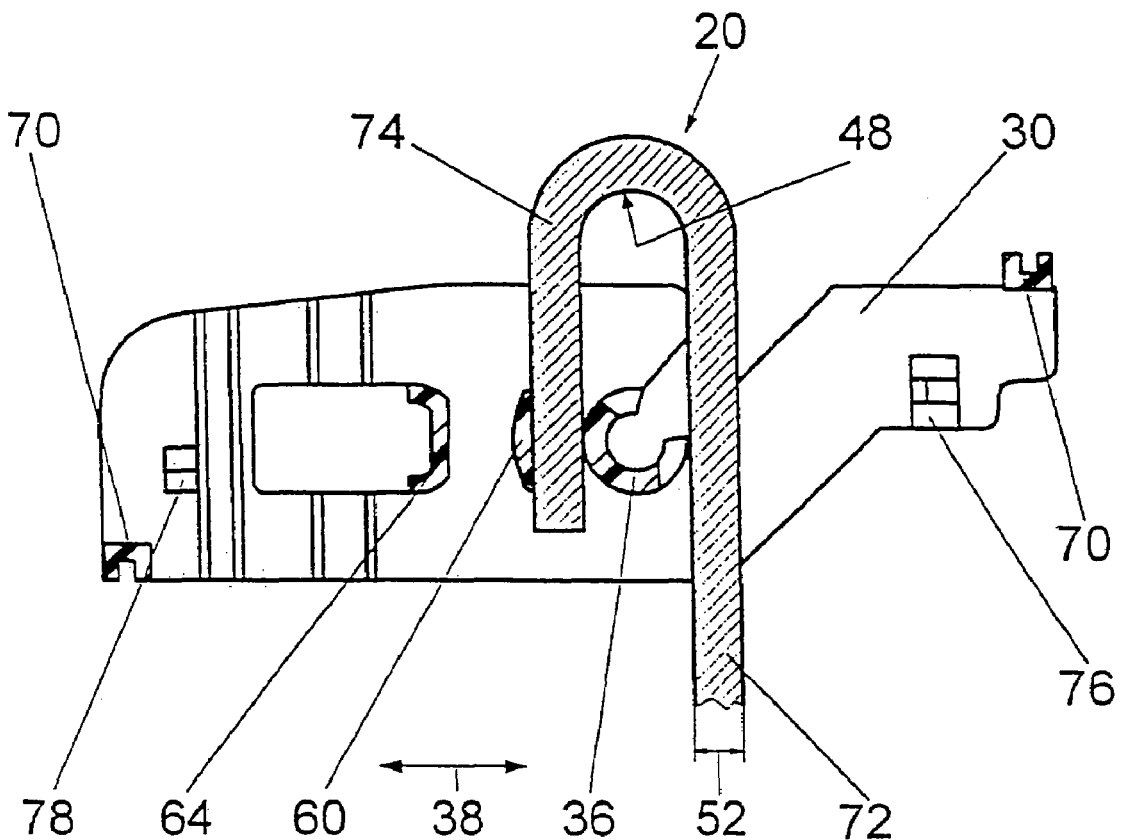
FIG. 4 is a longitudinal section corresponding to FIG. 2 with a half-mounted bearing element on a wiper rod with a larger width and a smaller material thickness.

The windshield wiper shown in FIG. 1 has a wiper arm 12 with a fastening part 14 and an articulating part 16 to which a wiper rod 18 is attached. The articulating part 16 and the wiper rod 18 can also be embodied as being of one piece. With its hook-shaped end 20 (FIG. 5), the wiper rod 18 holds a bearing element 30, which is disposed between side-pieces of a center bracket 22 and includes a supporting bolt 28 of the center bracket 22 with an open hub 36. The center bracket 22 is part of a wiper blade 10 whose wiper strip 26 is articulatingly connected to the center bracket 22 by way of claw brackets 24.

The bearing element 30 has two side walls 32, 34 extending in the longitudinal direction 38, which are connected to each other by way of the hub 36, a first lateral strut 60, a second lateral strut 64, and additional lateral struts 70. The side walls 32, 34 have different sized clearances 40, 42 on their ends, wherein the smaller clearance 4 is formed by beads 44 so that externally, the width of the bearing element 30 is the same at both ends despite the different clearances 40, 42 and as a result, the bearing element 30 is reliably guided in the center bracket 22. The different clearances 40, 42 are provided for wiper rods 18 with a corresponding width, which are guided with the hook-shaped end 20 between the side walls 32 and 34. Consequently, the bearing element 30 can be used for wiper rods 18 with two different widths.

The lateral struts 60, 64, 70 are arranged in the longitudinal direction 38 at both sides of the hub 36.

Figure 5:
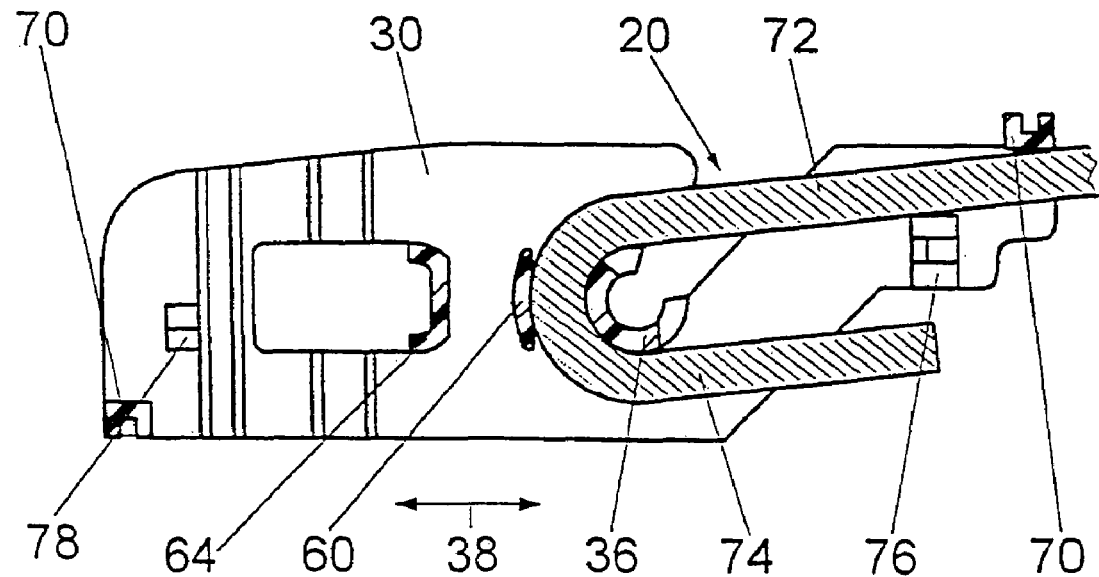
FIG. 5 is a longitudinal section corresponding to FIG. 4, with a bearing element in the mounted position.

The hook-shaped end 20 with a smaller material thickness 52 and a smaller bending radius (FIG. 5) is slid lateral to the longitudinal direction 38 through the bearing element 30 and is pulled over the hub 36 until the inner contour rests against the hub 36. Then it is pivoted by approx. 90° until it rests with its longer leg 72 against the addition strut 70 and engages in detent fashion between it and a detent projection 76 (FIG. 5). In the mounted position (FIG. 5), the legs 72, 74 of the wiper rod 18 are disposed nearly parallel to the longitudinal direction 38, but with a slight inclination so that the inner and outer sides of the longer leg 72 rest in a play-free manner against the detent projection 76 or against the additional lateral strut 70. This is achieved in particular by virtue of the fact that in relation to the additional lateral strut 70, the detent projection 76 is disposed offset toward the hub 36 in the longitudinal direction 38.

Figure 6:
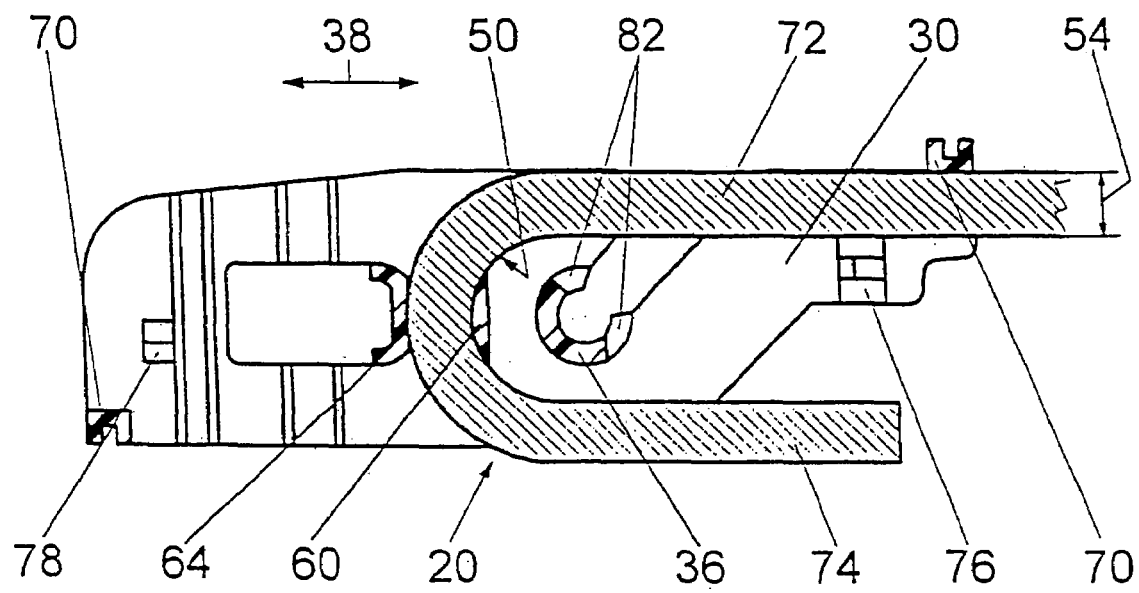
FIG. 6 is a section corresponding to FIG. 5, but with a wiper rod that has a larger material thickness and a larger bending radius of its hook-shaped end.

In the longitudinal direction 38, the hook-shaped end 20 is held by the first lateral strut 60, which is disposed at a distance 56 from the hub 36 that corresponds to the smaller material thickness 52. On the side remote from the hub 36, the first lateral strut 60 has a contact fact 62 for a wiper rod 18 with a hook-shaped end 20, which has a larger bending radius 50 and a larger material thickness 54 (FIG. 6). The hook-shaped end 20 according to FIG. 6 is mounted in a manner similar to the one according to FIG. 5, but it is pulled over the hub 36 and the first lateral strut 60 and is then pivoted by 90° around a virtual axis that is disposed between the contact face 62 and the hub 36 until the longer leg 72 engages in detent fashion between the additional lateral strut 70 and the detent projection 76. Corresponding recesses 82 are provided on the hub 6 so that the hook-shaped end 20 can be pulled over the hub 36 and the first lateral strut 60, and can then be rotated.

The elements 70, 76, 78 are actually detent means which hold the bearing element 30 by the hook-shaped end 20.

Figure 7:
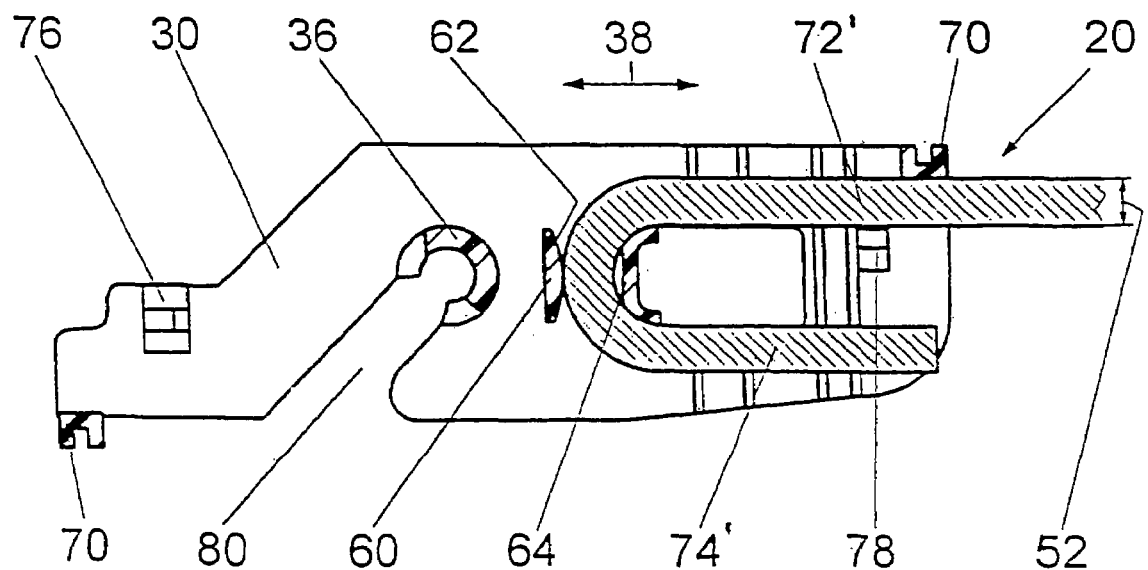
FIG. 7 is a section corresponding to FIG. 5, with a bearing element that is rotated by 180° and is for a narrower wiper rod.
Figure 8:
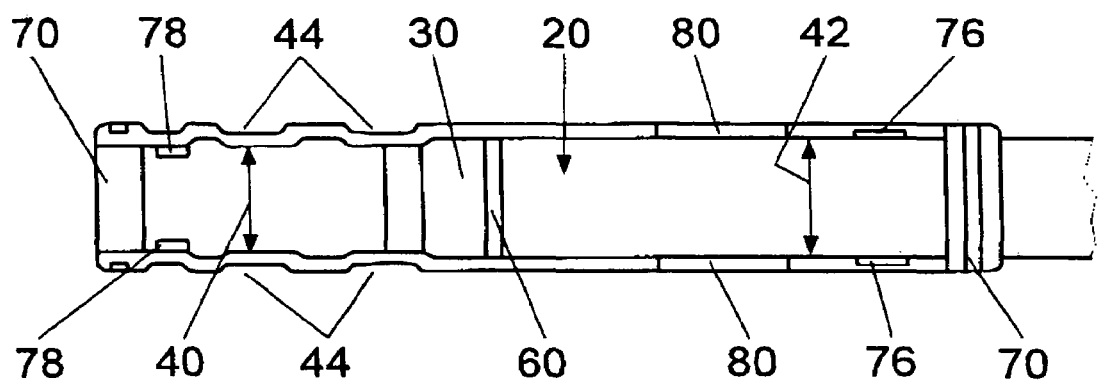
FIG. 8 shows a view from above of a wider wiper rod (hook-shaped end) corresponding to the section of FIG. 5.
Figure 9:
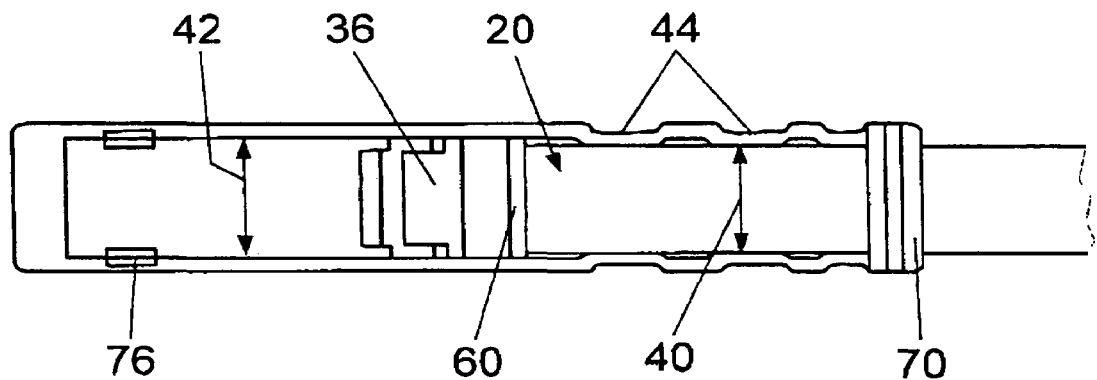
FIG. 9 shows a corresponding view of a smaller wiper rod (hook-shaped end) corresponding to the section of FIG. 7.

For securing in the longitudinal direction 38, a second lateral strut 64 is provided at the distance 58 from the first lateral strut 60. Toward the first lateral strut 60, this second lateral strut has a contact face 66, which has a flattening 68 in its central region. The contact face 66 is used to receive a hook-shaped end 20 of a narrower wiper rod 18 with a smaller bending radius and a smaller material thickness 52 (FIG. 7). The flattening 68 achieves the fact that the contact face 62 of the first lateral strut 60 can provide for the axial securing of the hook-shaped end 20 with the smaller material thickness 52 according to FIG. 7, and a spacing 58 is nevertheless achieved for a hook-shaped end 20 with a larger material thickness 54 according to FIG. 6.

In FIG. 7 the longer and shorter legs are identified as 72' and 74'.

In order to mount the bearing element 30 on the supporting bolt 28, recesses 80 are provided in the side walls 32, 34 and are connected to the open side of the hub 36. Through the elasticity of the material, the bearing element 30 can be clipped onto the supporting bolt 28 and consequently can be packaged and supplied in a pre-assembled state with the wiper blade 10.

The bearing element 30 according to the invention can be used for wiper rods 18 with two different widths, material thickness 52, 54, and bending radii 48, 50. As a result, the requirements for the three most common wiper rods 18, namely with a cross sectional profile of 8×3 mm, 9×3 mm, and 9×4 mm, can be fulfilled by one bearing element 30. It replaces and reduces the bewildering array of bearing element that are normally packaged along the wiper blade 10. Furthermore, it can be pre-assembled in a user-friendly manner and additionally reduces the packaging size.

The invention claimed is:

1. An elongated bearing element (30) for hinging a wiper blade (10) to a hook-shaped end (20) of a wiper rod (18) of a windshield wiper, comprising a hub (36) which is open over part of a circumference and formed for placing the bearing element (30) onto a supporting bolt (28) of the wiper blade (10), contacting faces (46, 62, 66) and detent means (76, 78) for holding the bearing element (30) by the hook-shaped end, two side walls (32, 34) that are connected by the hub (36), and a number of lateral struts (60, 64, 70) that are arranged a longitudinal direction (38) on both sides of the hub (36) and guidable laterally by legs (72, 74) of the hook-shaped end (20), wherein a clearance (40, 42) between the side walls (32, 34) corresponds to a width of the legs (72, 74), whereby a smaller wiper rod or a larger wiper rod each (18) with different widths is mountable by turning the element (30) substantially over 180° around the hub (36); the side walls (32, 34), in a region for legs (72, 74) of a hook-shaped end (20) of the smaller wiper rod (18) on one side of the hub (36), have a small clearance for lateral guidance of the smaller wiper rod (18), while the sidewalls (32, 34) in a region for the legs (72, 74) of the larger wiper rod (18) of a hook-shaped end (20) on another side of the hub (36) have a large clearance extending over more than a half of a length of the side walls (32, 34) for lateral guidance of the larger wiper rod (18).

2. The bearing element (30) according to claim 1, characterized in that one of the clearances of the side walls (32, 34) is reduced on one end by beads (44).

3. The bearing element (30) according to claim 1, characterized in that an outer contour of the hub (36) has the contact face (46) for the hook-shaped end (20) of the smaller wiper rod (18) with a small bending radius (48) and a small material thickness (52) and a first of the lateral struts (60) is disposed at a distance (56) from the hub (36) in the longitudinal direction (38).

4. The bearing element (30) according to claim 1, characterized in that the additional lateral strut (70) is disposed at ends of the side walls (32, 34) for limiting the pivoting motion of the wiper rod (18) so that legs (72, 74) of the hook-shaped end (20) extend virtually parallel to the longitudinal direction (38) in a mounted position.

5. The bearing element (30) according to claim 1, characterized in that on an outer contour remote from the hub (36), a first of the lateral struts (60) has the contact face (62) for the hook-shaped end (20) of a wiper rod (18) with a larger bending radius (50) and a larger material thickness (54), and a second of the lateral struts (64) is disposed at a distance (58) from the first lateral strut (60) in the longitudinal direction (38).

6. The bearing element (30) according to claim 5, characterized in that the second lateral strut (64) has a flattened contact face (66) that is oriented toward the hub (36) and is for a smaller wiper rod (18) with a hook-shaped end (20) that has a smaller bending radius (48) and a smaller material thickness (52).

7. An elongated bearing element (30) for hinging a wiper blade (10) to a hook-shaped end (20) of a wiper rod (18) of a windshield wiper, comprising a hub (36) which is open over part of a circumference and formed for placing the bearing element (30) onto a supporting bolt (28) of the wiper blade (10), contacting faces (46, 62, 66) and detent means (76, 78) for holding the bearing element (30) by the hook-shaped end, two side walls (32, 34) that are connected by the hub (36), and a number of lateral struts (60, 64, 70) that are arranged a longitudinal direction (38) on both sides of the hub (36) and guidable laterally by legs (72, 74) of the hook-shaped end (20), wherein a clearance (40, 42) between the side walls (32, 34) corresponds to a width of the legs (72, 74), whereby a smaller wiper rod or a larger wiper rod each (18) with different widths is mountable by turning the element (30) substantially over 1800 around the hub (36); the side walls (32, 34), in a region for legs (72, 74) of a hook-shaped end (20) of the smaller wiper rod (18) on one side of the hub (36), have a small clearance for lateral guidance, while the sidewalls (32, 34) in a region for the legs (72, 74) of the larger wiper rod (18) of a hook-shaped end (20) on another side of the hub (36) have a large clearance for lateral guidance, wherein the additional lateral strut (70) is disposed at ends of the side walls (32, 34) for limiting the pivoting motion of the wiper rod (18) so that legs (72, 74) of the hook-shaped end (20) extend virtually parallel to the longitudinal direction (38) in a mounted position, and wherein on the side walls (32, 34), starting from the additional lateral strut (70), the detent means have at least one detent projection (76, 78), which in the mounted position, rests against an inner side of a long leg (72) of the hook-shaped end (20).

8. The bearing element (30) according to claim 7, characterized in that in relation to the additional lateral strut (70), the at least one detent projection (76, 78) is disposed offset toward the hub (36) in the longitudinal direction (38) so that the wiper rod (18) with a smaller material thickness (52) and a smaller bending radius (48) is held in a play-free manner with a slight inclination in relation to the longitudinal direction (38).

* * * * *